March 3, 1964

R. M. GERAGHTY 3,123,040

BACK-UP ALARM MOUNT

Filed Jan. 24, 1962

ROBERT M. GERAGHTY
INVENTOR.

BY Charles S. Evans his ATTORNEY

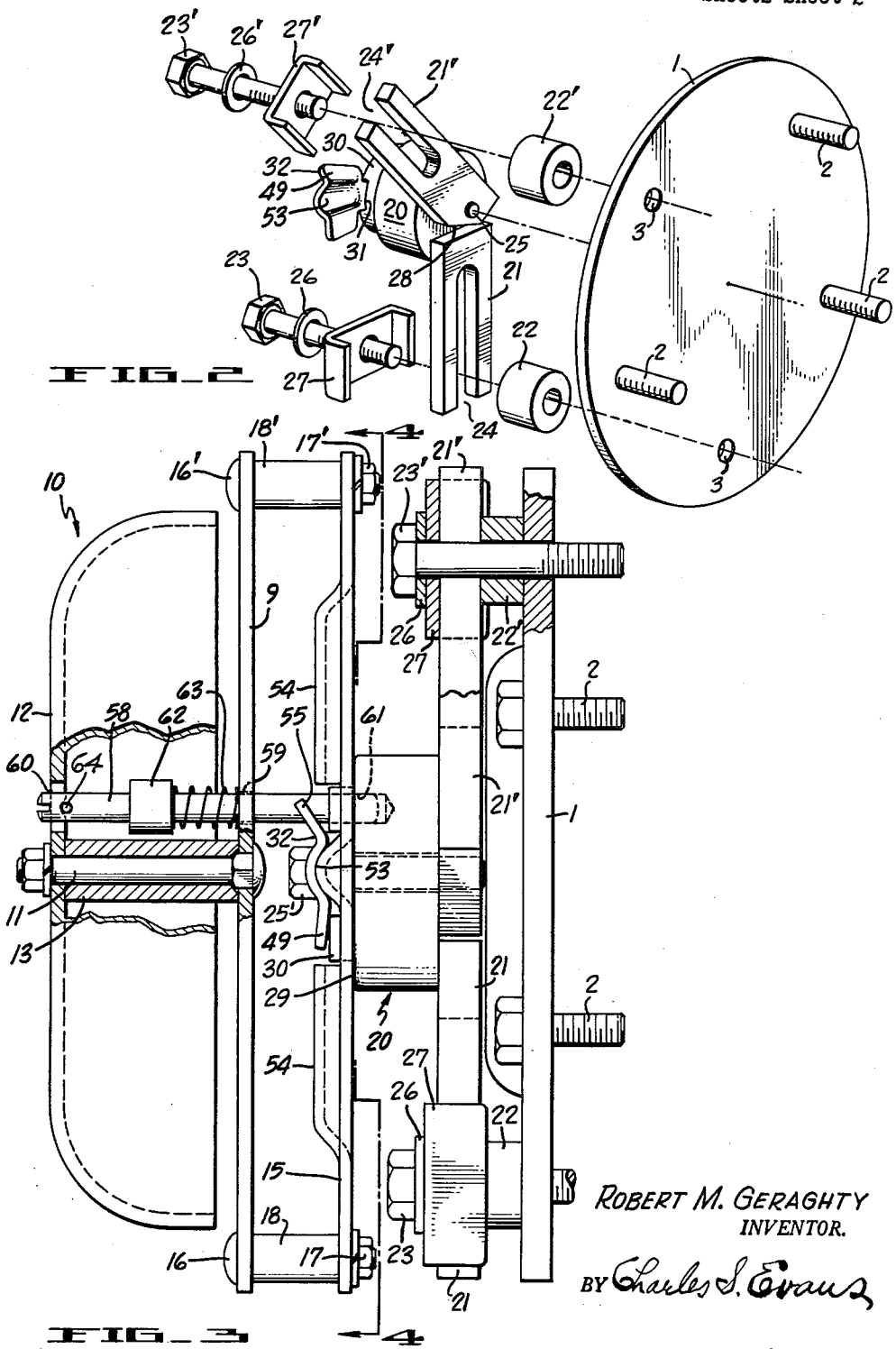

March 3, 1964  R. M. GERAGHTY  3,123,040
BACK-UP ALARM MOUNT
Filed Jan. 24, 1962  3 Sheets-Sheet 3
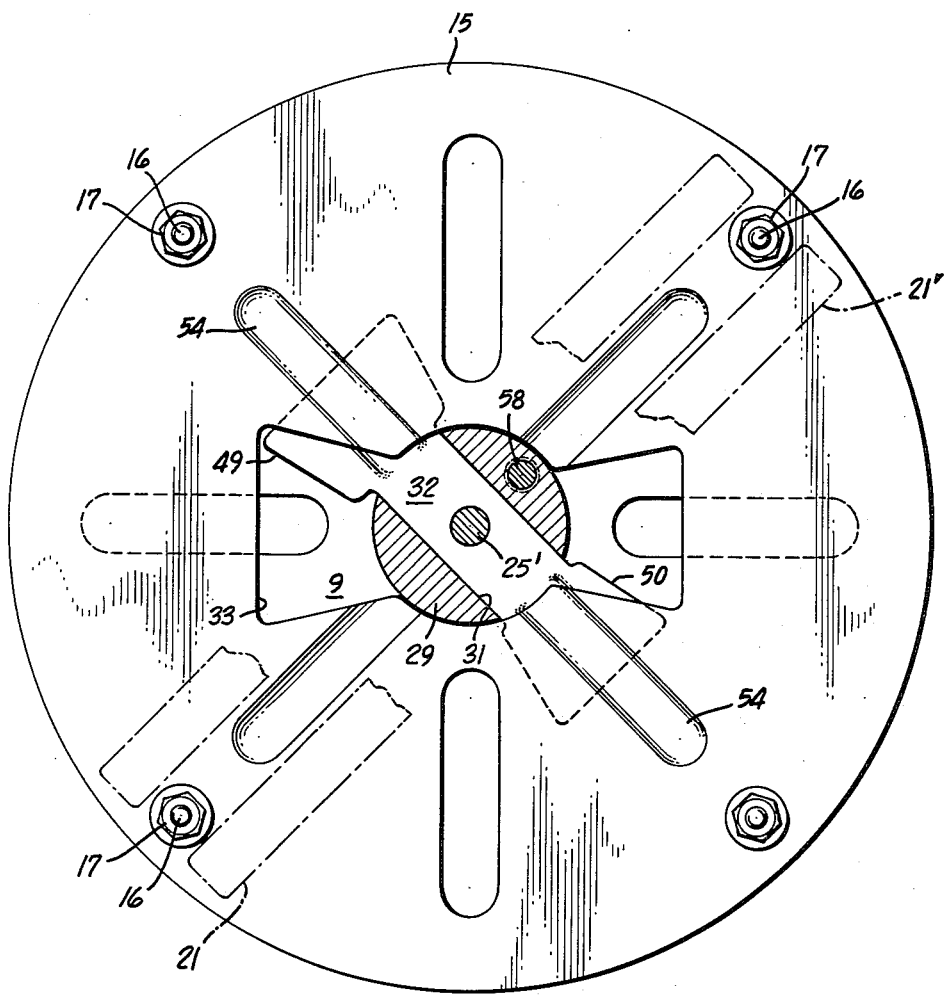
FIG_4
ROBERT M. GERAGHTY
INVENTOR.
BY Charles S. Evans
his ATTORNEY

United States Patent Office 3,123,040
Patented Mar. 3, 1964

3,123,040
BACK-UP ALARM MOUNT
Robert M. Geraghty, Novato, Calif., assignor to E. D. Bullard Company, Sausalito, Calif., a corporation of California
Filed Jan. 24, 1962, Ser. No. 168,490
12 Claims. (Cl. 116—60)

This invention relates to an alarm signal device which is adapted to be secured to a wheel of a truck or other vehicle for giving an audible signal upon rotation of the wheel when the vehicle is moving. An example of such a device is disclosed in my own earlier U.S. Patent No. 2,843,075.

More particularly my present invention is directed to a mounting means for securing the alarm structure to a truck wheel by utilizing cap screws which also assist in securing the end plate to the hub of the wheel. One of the objects of this method of mounting is that interference with the removal and replacement of the vehicle wheel is avoided.

The alarm devices to which this invention relates are particularly suitable for use on trucks, tractors and like vehicles when the same are operating under conditions in which visibility from the driver's seat is poor. The audible signal emitted by the alarm alerts workmen and others in the area that a nearby vehicle is moving, thereby helping to obviate accidents.

The use of such alarm devices is particularly valuable when the vehicle on which it is installed is backing up, since the driver's visibility is particularly impaired in such a case. It is therefore customary to design the alarm device so that it operates only when the vehicle is moving in a backward direction. For this reason such signal devices are usually called "back-up alarms."

One of the problems encountered in connecting a signal structure to the wheel of a vehicle is that it is likely to interfere with removal and replacement of the wheel to which it is secured. Another problem involved in such an installation is that although it is preferable to standardize the design and structure of the signal structure, it is necessary to install it on various kinds and sizes of wheels. Such wheels generally include a hub closed by an end plate which protects the wheel bearing but, depending on the vehicle involved, such end plate may vary in diameter and also vary in the location and spacing of the cap screws which secure it to the hub barrel.

It is therefore the main object of the instant invention to provide means for mounting a back-up alarm on the hub of a vehicle wheel and which is readily adapted for securement to any hub regardless of size, and the spacing of the cap screws which secure the end plate on the hub barrel.

Another object of the invention is the provision of a mounting means for securement of a back-up alarm to a vehicle wheel, and which permits a quick removal and change of tires when necessary without material interference since only the alarm is removed by loosening one lock pin.

Still another object of the invention is the provision of a quick release mount for securing an alarm structure to a wheel in a manner such as to prevent loosening of the mount due to shock and vibration.

Other objects and advantages will be apparent from the following specification and from the drawings:

FIG. 1 is an exploded perspective of my mounting means shown in combination with the alarm structure and an end plate which normally closes the hub barrel of a motor vehicle wheel. The hub itself is not shown. Portions are broken away to disclose underlying parts.

FIG. 2 is an exploded perspective of the mounting means and end plate of FIG. 1 but with the arms 21 and 21' of a main portion angularly disposed for mounting on an end plate having an odd number of securing cap screws.

FIG. 3 is a side elevation of the mounting means of the invention assembled with an alarm structure and an end plate of the hub. Portions are broken away and in section to show internal structure.

FIG. 4 is a vertical cross sectional view taken in a plane indicated by the line 4—4 of FIG. 3, but with the retainer bar 32 angularly disposed at 45° to the horizontal.

Figure 1:
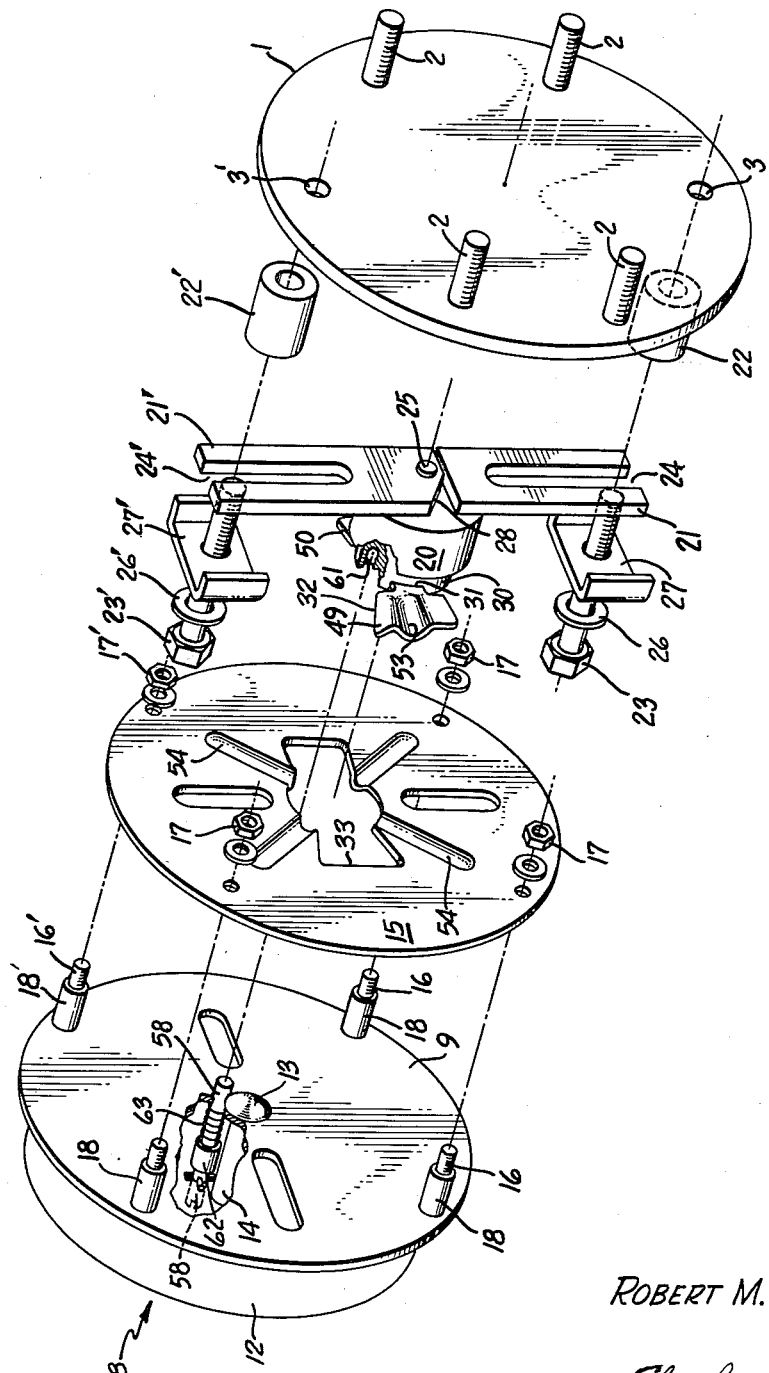

In detail and with reference to FIG. 1, the invention is adapted to be employed in combination with a vehicle wheel having a hub which includes an end plate 1, usually secured to the hub by cap screws 2. In the drawings, the wheel and hub barrel are not shown, but only the hub end plate 1, through which extend all but two of the cap screws 2 which are threaded into the end of the hub barrel to hold the plate thereon. The cap screws 2 are shown at the right end of FIG. 1, the heads being invisible behind the end plate 1.

In the drawings, an alarm device is generally designated by 8, and may be of the type shown in the above-noted Patent No. 2,843,075. It includes a back plate 9, on which a bell 12 is mounted by means of a central bolt 11 and sleeve 13 (FIG. 3). The internal mechanism for operating the alarm is not shown.

In the present invention, the back plate 9 is secured to a mounting plate 15, by bolts 16—16' and nuts 17—17'. Tubular spacers 18—18' surround bolts 16—16' and serve to hold back plate 9 and mounting plate 15 in parallelism but spaced a convenient distance apart.

Mounting plate 15 is releasably secured to a base block 20 which is provided with a pair of bifurcated arms 21—21' which, in turn, when disposed on spacers 22—22' are secured to the plate 1 by long cap screws 23—23' passing through holes 3—3' in the end plate and threaded into the end of the hub barrel, as shown in FIG. 3.

The arm 21 is integral with the base block on its inner side, and at the outer end, the arm is bifurcated to provide an elongated slot or opening 24 (FIGS. 1 and 2) to permit reception of cap screws 23, which may lie at various distances from the center of plate 1. The arm 21' is similar to arm 21, but is pivotally connected to the base block by the bolt 25, preferably centrally located in the base block. One corner of the arm is removed as at 28 to permit pivotal movement. Arm 21' is provided with a slot 24' similar to slot 24 and for the same purpose.

It is noted that arm 21' may be swung on bolt 25 from a position indicated in FIG. 1 in which it is in alignment with fixed arm 21, to a position such as shown in FIG. 2, in which it is angularly disposed relating to arm 21. If the end plate is provided with an even number of cap screws, such as six, the arms 21—21' will be in alignment, but when an odd number of cap screws, such as five, are used, arm 21' may be swung to a position as shown in FIG. 2 with the slot 24' in registration with the pass hole in the end plate.

From the above it will be clear that whether the end plate of the hub is held in place on the hub barrel by an odd or an even number of cap screws, two opposite cap screws can be removed without disturbing the others, and the base block can be rigidly secured to the plate by two cap screws 23—23' of selected length tightened into the vacated holes. In this final position they have passed through washers 26—26', washer plates 27—27', the bifurcated arms, the spacers 22—22' of selected length to give clearance to varying projections or extensions on the outer face of the end plate, through the pass holes and into the vacated threaded seats in the hub barrel.

The outer side of base block 20 opposite the arms 21—21' is reduced in diameter to provide an annular shoulder 29 (FIG. 3) and a central boss 30. The boss 30 is formed with a diametrically extending slot 31 (FIG. 2) which receives therein the central portion of an elongated retainer bar or arm 32 which extends radially outwardly from the base block 20, but is held in the slot by the bolt which is threaded through the base block.

Mounting plate 15 is provided with an opening 33 which is somewhat the same shape as but slightly larger than the retainer bar 32 and end of boss 30, so that mounting plate 15 may be applied against the annular shoulder 29 with bar 32 passed through opening 33. In this position the mounting plate may be turned 45° into tight interlocking with the retainer bar.

Wings 49 and 50 are transversely bent to provide longitudinally extending grooves 53 which are adapted to cooperate with ribs 54, formed on the mounting plate 15 when the mounting plate is turned 45° relative to base block 20 and the retainer bar. To this end the wings 49 and 50 are flared along one side edge as seen in FIG. 3, to provide camming surfaces 55 that permit the wings to ride up on the ribs 54 until the latter seat in grooves 53. By proper proportioning of the wings 49, 50 and ribs 54, the mounting plate 15 may be held tightly against annular shoulder 29 on base block 20 by the resiliency of retainer bar 32 and its wings 49 and 50.

To insure against undesired relative rotation of mounting plate 15 and base block 20 under the most severe conditions of shock and vibration, a spindle 58 is mounted in the alarm structure as shown in FIG. 3, extending loosely through the hole 59 in the back plate 9 and the hole 60 in the bell wall 12. Its inner end passes through the opening 33 in the mounting plate 15 and seats loosely in a socket hole 61 formed in the outer face of the base block 20. So seated it prevents unlocking rotary movement and dismounting of the mounting plate 15 from the base block.

The spindle 58 has a fixed flange or collar 62 half way between the bell wall and back plate; and a coil spring 63 is interposed around the spindle and between the collar and the back plate to provide continuous pressure tending to unseat the spindle from the base block. Disengagement of the spindle from the base block is prevented by a cross pin 64, fixed in the spindle and extending across the hole 60, its ends lying in a groove or depression on each side of the hole.

The end of the spindle is slotted as shown, and with a screwdriver in the slot, the spindle may be pushed in to unseat the cross pin from its grooves at the sides of the hole, and then turned 90° to allow the spring 63 to unseat the spindle from the base block 20, the cross pin then passing through corresponding notched extensions of the hole 60 above and below the spindle. With spindle disengaged from the base block, the frame formed by the connected back plate 9 and the mounting plate 15 may be rotated 45° to free the mounting plate from the retaining bar 32 and lifted clear of the wheel hub. Unscrewing the two cap screws 23 and 23' frees the base block and its arms, and when desired unscrewing the remaining cap screws removes the end plate from the hub barrel.

It is preferable to mount the alarm on the base 20 in but one position. To this end, wing 50 of retainer bar 32 is made smaller than wing 49; and the opening 33 in the mounting plate is complementarily formed so that it may be applied to annular shoulder 29 in only one position. By this structure the stud 58 is always in registration with hole 61 when the grooves 53 on wings 49 and 50 are in registration with ribs 54 on the mounting plate.

When it becomes necessary to remove the wheel on which the alarm is mounted, it is merely necessary to turn spindle 58, so that spring 63 releases it from the base block 20; and then manually rotate the mounting plate 15 in a clockwise direction (counterclockwise in FIG. 4) to release ribs 54 from the grooves 53 in wings 49 and 50, and place the opening 33 in registration with retainer bar 32, so that the alarm with its mounting plate may be withdrawn from the fixed base block.

In operation of the mounting device once the base 20 has been secured to the axle by means of arms 21 and 21' it is never necessary to disturb the mount formed thereby. To secure the alarm in place it is then merely necessary for the operator to apply the alarm device including mounting plate 15 to the base 20 with the opening 33 in mounting plate 15, in registration with retainer bar 32 so that the inner side of mounting plate 15 engages the annular shoulder 29 of base block 20. The mounting plate 15 is then rotated counterclockwise (clockwise in FIG. 4) until ribs 54 on plate 15 are seated in grooves 53 in retainer bar 32. Some effort may be required to reach the desired position because it is necessary to deflect wings 49 and 50 of the resiliently flexible retainer bar. However, said resiliency serves to yieldably hold the alarm in place after it has been installed. During the mounting operation the cam surfaces 55 formed on the wings 49 and 50 assist in deflecting the wings to the extent required to effect interengagement of grooves 53 and 54.

After the above operation has been performed manually, it is merely necessary to insert spindle 58 in the hole 61 to insure against accidental loosening and separation of the alarm unit from its mounting on the wheel.

I claim:
1. Means for securing a back-up alarm to a wheel, comprising:
    a member fixed for rotation with the wheel,
    a base block having a pair of radial arms extending therefrom,
    cooperating securement means fixing the radial arms on the wheel member with the central axis of the base block coincident with the rotational axis of the wheel,
    a radially extending arm disposed on the base block,
    a mounting plate having an opening therein to pass the arm and seated against the base block with the arm engaged against the far side of the mounting plate,
    means connecting the back-up alarm to the mounting plate,
    a supporting back plate rigidly connecting to the mounting plate, and
    a stop pin rotatably mounted in the back plate passing through an opening in the mounting plate and seating in the base block.

2. The combination of claim 1 in which a recovery spring is interposed between the stop pin and the back plate and the stop pin is provided with a cross pin seating against a portion of the alarm structure to prevent release of the stop pin from the base block.

3. Means for securing a back-up alarm to a wheel, having a hub cap secured by cap screws comprising:
    a cylindrical base block having an arm rigidly connected therewith and an arm pivotally connected thereto, both said arms having openings therein for securing the arms to hub cap holding screws with a central axis of the base block coincident with the rotational axis of the wheel,
    radially extending arms fixed on the base block, on the side opposite the rigid and the pivoted arms,
    a mounting plate having an opening therein to pass the radial arms and seated against the base block with the radial arms engaged against the far side of the mounting plate,
    means connecting the alarm structure to the mounting plate and
    a supporting back plate rigidly connected to the mounting plate.

4. The combination of claim 4 in which a spring press stop pin mounted in the backing plate extends through the mounting plate into a socket in the base block to prevent rotary movement of the mounting plate relative to the base block.

5. The combination of claim 4 in which a stop pin mounted in the back plate extends through the alarm structure of one side thereof and on the other side thereof extends through the mounting plate and into a releasable connection with the base block to prevent rotary movement of the mounting plate relative to the base block.

6. Means for securing a back-up alarm to a wheel, comprising:
 a wheel member fixed for rotation with the wheel,
 a base block having first and second pairs of radially extending arms mounted thereon,
 cooperating securement means fixing the first pair of radially extending arms on the wheel member with the central axis of the base block coincident with the rotational axis of the wheel,
 a mounting plate having an elongated opening therein detachably locked to the base block behind said second pair of radially extending arms by rotary movement from a first position in which said second pair of arms pass through the opening to a second position in which said arms engage behind the mounting plate,
 and means connecting the back-up alarm to the mounting plate.

7. The combination according to claim 6 in which means on the mounting plate and the second pair of radially extending arms cooperate when said mounting plate is in said second position to prevent inadvertent disengagement of the mounting plate from the base block.

8. The combination according to claim 6 in which a stop pin engaging the mounting plate seats in the base block to prevent rotary disengagement of the mounting plate from the base block.

9. The combination according to claim 6, in which a supporting back plate is rigidly connected to the far side of the mounting plate in spaced relation thereto and said back-up alarm is connected to the supporting back plate on the opposite side thereof from the mounting plate.

10. Means for securing a back-up alarm to a wheel having a hub cap secured by cap screws comprising:
 a cylindrical base block having an arm rigidly connected therewith and an arm pivotally connected thereto,
 said arms having openings therein for securing the arms to hub cap holding screws with the central axis of the base block coincident with the rotational axis of the wheel,
 radially extending retainer arms fixed on the base block on the side thereof opposite the rigid and pivoted arms,
 a mounting plate having an elongated opening therein and seated against the base block with the retainer arms engaged against the far side of the mounting plate upon rotation of the mounting plate from a first position in which the retainer arms may pass through said opening to a second position in which the retainer arms engage against the far side of the mounting plate,
 and means connecting the alarm structure to the mounting plate.

11. The combination of claim 10 in which the arms constitute a resilient flexible retainer bar extending radially in opposite sides of the base block.

12. The combination of claim 10 in which the mounting plate is provided with radial ribs and the arms constitute a resiliently flexible retainer bar having grooved ends engaged over the ribs.

References Cited in the file of this patent
UNITED STATES PATENTS

| | | |
|---|---|---|
| 2,843,075 | Geraghty | July 15, 1958 |
| 3,039,423 | Warn | June 19, 1962 |